US009513395B2

(12) United States Patent
Zhang et al.

(10) Patent No.: US 9,513,395 B2
(45) Date of Patent: Dec. 6, 2016

(54) METHOD FOR DETECTION OF SUBSURFACE SEISMIC EVENTS IN VERTICALLY TRANSVERSELY ISOTROPIC MEDIA

(75) Inventors: Yang Zhang, Ann Arbor, MI (US); Leo Eisner, Houston, TX (US)

(73) Assignee: Microseismic, Inc., Houston, TX (US)

( * ) Notice: Subject to any disclaimer, the term of this patent is extended or adjusted under 35 U.S.C. 154(b) by 1194 days.

(21) Appl. No.: 12/870,906

(22) Filed: Aug. 30, 2010

(65) Prior Publication Data

US 2012/0051178 A1    Mar. 1, 2012

(51) Int. Cl.
*G01V 1/38* (2006.01)
*G01V 1/42* (2006.01)
*G01V 1/28* (2006.01)

(52) U.S. Cl.
CPC ............. *G01V 1/42* (2013.01); *G01V 1/288* (2013.01); *G01V 1/38* (2013.01); *G01V 2210/1234* (2013.01); *G01V 2210/586* (2013.01); *G01V 2210/65* (2013.01)

(58) Field of Classification Search
USPC .......................................................... 367/38
See application file for complete search history.

(56) References Cited

U.S. PATENT DOCUMENTS

| | | | |
|---|---|---|---|
| 6,944,094 B1* | 9/2005 | Thomsen et al. | 367/57 |
| 7,663,970 B2 | 2/2010 | Duncan et al. | |
| 7,924,652 B2* | 4/2011 | Tang et al. | 367/35 |
| 2004/0041815 A1* | 3/2004 | Meek et al. | 345/582 |
| 2004/0093163 A1* | 5/2004 | Reshef et al. | 702/14 |
| 2005/0090986 A1* | 4/2005 | Van Riel et al. | 702/6 |
| 2005/0207278 A1* | 9/2005 | Reshef et al. | 367/38 |
| 2008/0068928 A1* | 3/2008 | Duncan et al. | 367/73 |
| 2008/0165619 A1* | 7/2008 | Bachrach et al. | 367/38 |
| 2008/0298174 A1* | 12/2008 | Tang et al. | 367/27 |
| 2009/0299637 A1* | 12/2009 | Dasgupta | 702/12 |

FOREIGN PATENT DOCUMENTS

WO    2010080366 A1    7/2010

OTHER PUBLICATIONS

Thomsen, Leon; "Weak elastic anisotropy". Geophysics. vol. 51. No. 10. Oct. 1986. p. 1954-1966.*
Gajewski, D. and Tessmer, E; "Imaging of Passive Seismic Sources by Reverse Modeling" EAGE Madrid. Jun. 2005.*
Ludmila Adam, Kasper van Wijk, and Thomas L. Davis. "Multi-level 3D VSP travel time inversion in VTI media, Weyburn Field, Canada". 73rd Ann. Internat. Mtg.: Soc. of Exploration Geo.2003.*
International Search Report and Written Opinion, International Application No. PCT/US2010/046989.
Written Opinion of the International Search Authority, International Application No. PCT/US2011/046989.

* cited by examiner

*Primary Examiner* — James Hulka
(74) *Attorney, Agent, or Firm* — Richard A. Fagin

(57) ABSTRACT

A method for determining positions and origin times of seismic events occurring in the Earth's subsurface includes accepting as input to the method signals recorded from a plurality of seismic sensors deployed above a subsurface volume of interest. The recorded signals are a representation of seismic amplitude with respect to time. Origin time and location of each of a plurality of subsurface seismic events are determined from the recorded signals. The origin times and locations of each event are inverted to obtain Thomsen's parameters in formations in the volume of interest. Depths of each of the events are determined by individually searching the depth of each event, the inversion with each incorporated new depth including updating the Thomsen parameters and setting as a limit a minimum value of RMS error.

16 Claims, 4 Drawing Sheets

METHOD FOR DETECTION OF SUBSURFACE SEISMIC EVENTS IN VERTICALLY TRANSVERSELY ISOTROPIC MEDIA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of passive detection and imaging of subsurface occurring seismic events. More particularly, the invention relates to such techniques as may be applied in rock formations with transverse isotropy with vertical axis of symmetry ("VTI").

2. Background Art

Passive seismic emission tomography is a process in which an array of seismic sensors is deployed in a selected pattern on or near the Earth's surface (or on the sea floor in marine surveys) and seismic energy is detected at the sensors that emanates from various seismic events occurring within the Earth's subsurface. Processing the signals detected by the sensors is used to determine, among other things, the position in the Earth's subsurface at which the various seismic events took place, the mechanism of failure of the formation and the origin time of such events.

Applications for passive seismic emission tomography include, for example, determining the point of origin of microearthquakes caused by movement along geologic faults (breaks in rock layers or formations), fracture propagation in nuclear storage sites, movement of fluid in subsurface reservoirs, wellbore mechanical processes (e.g., casing failures), and monitoring of movement of proppant-filled fluid injected into subsurface reservoirs to increase the effective wellbore radius of wellbores drilled through hydrocarbon-producing subsurface Earth formations ("fracturing"). The latter application, known as "frac monitoring" is intended to enable the wellbore operator to determine, with respect to time, the direction and velocity at which the proppant filled fluid moves through particular subsurface Earth formations.

One particularly useful technique for passive detection of origin position and time of subsurface occurring seismic events is described in U.S. Pat. No. 7,663,970 issued to Duncan et al. and assigned to the assignee of the present invention. The technique described in the foregoing patent includes transforming seismic signals recorded at selected positions into a domain of possible spatial positions of a source of seismic events. An origin in spatial position and time of at least one seismic event is determined from space and time distribution of at least one attribute of the transformed seismic data.

However, the correct characterization of microseismic events is dependent on using an accurate model of the velocities of the subsurface rock formations. Passive microseismic monitoring known in the art is carried out with temporarily deployed sensor arrays, either deployed in one or more subsurface monitoring wells or on the surface, as explained above. More recently, it is known in the art to semi-permanently or permanently deploy seismic sensors (e.g., geophones) in shallow boreholes ("buried array") to provide consistent microseismic mapping among different fracture treatments at the scale of a subsurface reservoir. This type of monitoring allows development of a consistent velocity model used for all fracture treatments used in a particular reservoir.

A particular consideration in accurate velocity model development is that certain subsurface rock formations exhibit seismic velocity anisotropy. Seismic anisotropy is the dependence of seismic velocity upon wave propagation direction. See, Thomsen, L., 1986, *Weak elastic anisotropy*, Geophysics, 51(10), 1954-1966.

Seismic anisotropy has been used widely with controlled source seismic surveying to improve reservoir imaging (see, e.g., Tsvankin, I., and V. Grechka, 2006, *Developments in seismic anisotropy: Treating realistic subsurface models in imaging and fracture detection*: CSEG Recorder, 31 (special edition), 43-46), lithogy discrimination (e.g., shales versus sands) (see, Vernik, L., 2007, *Anisotropic correction of sonic logs in wells with large relative dip*, Geophysics 73, E1 (2008); doi:10.1190/1.2789776), characterizing fractures and stresses, and monitoring the time-lapse changes in seismic characteristics of subsurface formations from which fluids are withdrawn (e.g., oil and gas). In controlled source ("active") seismic surveying, incorporating elastic anisotropy into migration algorithms allows proper positioning of reflectors, and further enhances the understanding of regional velocity structures. In passive seismic, accounting for velocity anisotropy is important among other parameters for obtaining accurate hypocenter locations, source mechanisms and optimal stacking of far offset receivers.

Current migration-type passive seismic event location techniques generally rely on compressional ("P") wave stacking from vertically sensitive seismic sensors (e.g., geophones or accelerometers). Typically, the velocity models are derived from 1D acoustic wellbore logs, or alternatively from vertical seismic profile ("VSP") or "checkshot" derived 1D models. Shear and compressional velocities within shales are faster in the horizontal plane than the vertical plane due to layering. As a result, it is observed that VTI-type of anisotropy increases the horizontal velocity and can explain why correct depth location of calibration shots is obtained only with the isotropic models with increased velocity. Scaling up of the isotropic velocity may provide locally similar location accuracy of perforation shots, however if a perforation shot or microseismic event occurs at a significantly different lateral position, the foregoing approximation may produce biased results as receiver statics are tuned to a chosen calibration position only. The VTI anisotropy seems to better reflect seismic velocity than scaled-up (often 1D) isotropic velocity profile, resulting in smaller residuals and more consistent receiver statics for multiple treatments. Thus using VTI anisotropy enables faster and more constant mapping of the new microseismic events at various parts of the reservoir.

What is needed is a method for mapping of subsurface seismic events that accounts for velocity anisotropy.

SUMMARY OF THE INVENTION

A method according to one aspect of the invention for determining positions and origin times of seismic events occurring in the Earth's subsurface includes accepting as input to the method signals recorded from a plurality of seismic sensors deployed above a subsurface volume of interest. The recorded signals are a representation of seismic amplitude with respect to time. Origin time and location of each of a plurality of subsurface seismic events are determined from the recorded signals. The origin times and locations of each event are then used to obtain Thomsen's parameters in formations in the volume of interest. Depths of each of the events are determined by individually the depth of each event, the iterative inversion of Thomsen parameters and update of the depths and origin times continues until a limit a minimum value of RMS error is reached.

Another aspect of the invention is a computer readable medium having stored thereon a computer program. The program has logic operable to cause a programmable computer to perform a method for determining positions and origin times of seismic events occurring in the Earth's subsurface. The method includes accepting as input to the method signals recorded from a plurality of seismic sensors deployed above a subsurface volume of interest. The recorded signals are a physical representation of seismic amplitude with respect to time. Origin time and location of each of a plurality of subsurface seismic events are determined from the recorded signals. The origin times and locations of each event are used to update Thomsen's parameters in formations in the volume of interest. Depths of each of the events are searched individually during joint inversion of all, the joint inversion includes updating the Thomsen parameters and the origin times, and setting as a limit a minimum value of RMS error.

Other aspects and advantages of the invention will be apparent from the following description and the appended claims.

DETAILED DESCRIPTION

Methods according to the invention will be described generally, and specifically with reference to an example use in monitoring the progression of subsurface fracture treatments of rock formations. A specific case study of an example implementation will then be described. In the described case study, an initial velocity model is a layered 1D isotropic model derived from a surface seismic checkshot survey, however the technique is generally applicable to 3D media. Because a checkshot survey generally provides seismic information only from single offset (source to sensor distance), the velocity model has to be smoothed to represent a 1D isotropic layered model of the rock formations. In the example case study, in order to locate a calibration shot (i.e., a perforating charge detonated at a known time and position), such model has to be artificially increased by a factor of 1.25. However, such approach is not consistent with understood physics of acoustic propagation in rock formations. The misfit between the checkshot derived velocity model and a model that locates the calibration shot to a correct depth can be explained by VTI type of acoustic velocity anisotropy within the subsurface region. Because the example case study was made using a shale reservoir, such results are consistent with results described in Sayers, C. M., 1993, *Anelliptic approximations for shales*, J. Seism. Explor., 2: 319-331 and Sayers, C. M., 1994, *The elastic anisotropy of shales*, J. Geophys. Res., 99(B1): 767-774. The research results described in the above references showed the that shales can develop strong anelliptic anisotropy due to intrinsic textural properties. Such information has been used in developing a method according to the invention for mapping of subsurface seismic events in the presence of VTI media.

Having described the scientific background of the present invention, examples of implementations will now be presented. As stated previously herein, one particular application of the present invention is mapping of fracture treatments of subsurface rock formations. An example of such treatment and corresponding acquisition of seismic signals will be explained with reference to FIG. 1.

Figure 1:
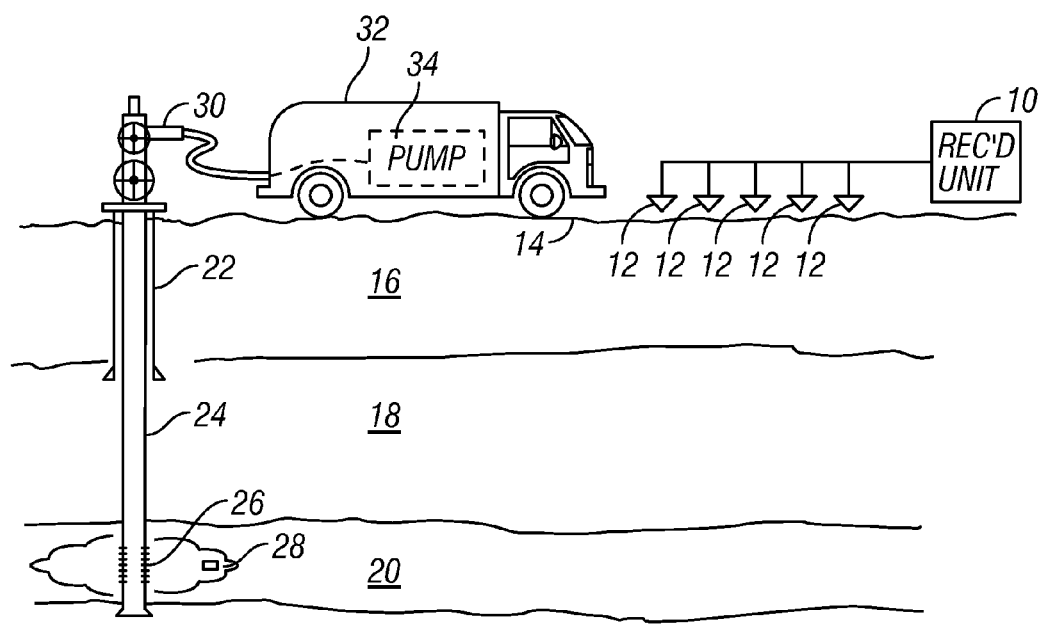
FIG. 1 shows an example of passive seismic data acquisition during fracture treatment of a wellbore.

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the sensor. The seismic sensors 12 generate signals, e.g., electrical or optical signals that ultimately are a physical representation of seismic amplitude. The signals are generated in response to the particle motion or acceleration, and such signals are ultimately coupled to a recording unit 10 for making a time-indexed recording of the signals from each sensor 12 for later interpretation by a method according to the invention. In other implementations, the seismic sensors 12 may be disposed at various positions within a wellbore drilled through the subsurface formations. A particular advantage of the method of the invention is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention. Generally, the seismic sensors 12 are oriented such that they are responsive to particle motion in the vertical direction.

In some embodiments, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals. In other embodiments, some or all of the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. In some embodiments, the sensors 12 may be arranged in directions substantially along a direction of propagation of acoustic energy that may be generated by the pumping unit 32, in the embodiment of FIG. 1 radially outward away from the wellhead 30. By such arrangement of the seismic sensors 12, noise from the pumping unit 32 and similar sources near the wellhead 30 may be attenuated in the seismic signals by velocity filtering such as frequency-wavenumber (f k) filtering. Other processing techniques for noise reduction and/or signal enhancement will occur to those of ordinary skill in the art.

Due to the fact that hydraulic fracturing may be conducted in rock formations at substantial depth below the surface, a visual examination of data recordings made (e.g., in the recording unit 10 in FIG. 1) may indicate no visible seismic event "arrivals" (amplitudes indicative of the time of detection of a seismic event in the subsurface) in the data recordings made from individual seismic sensors (12 in FIG. 1) even when such events are perforation charge detonations or calibration shots (detonation of explosive cord, called "string shots") at known position and depth. Therefore, the invention includes an inversion technique which may be based on observed microseismic events that are induced by the fracture pumping. In such method, P-wave arrival times are selected from individual receiver recordings (called "traces") where it is possible to observe distinct, direct arrivals of P-waves originating from the fracturing of rock formation as a result of the fracture pumping. The P wave arrivals may be selected visually, or may be selected by scanning the data recordings in the recording unit (FIG. 1) or other computer, for example, timing of P-wave arrivals can be determined from the time of maximum stacked energy in the receiver groups. (see FIG. 4). Recording amplitudes that, for example, exceed a selected threshold may be used to automatically in the computer or visually indicate P-wave arrivals.

An initial velocity model of the subsurface is typically a layered 1D isotropic model derived from extrinsic sources, for example, an active source seismic checkshot velocity taken in a nearly vertical well with a small lateral offset (horizontal distance between the seismic source and seismic sensor). Alternatively, if a wellbore is used wherein the location of the source or sensor at depth in the wellbore is displaced from the surface location of the wellbore, the other of the source or sensor should be disposed near the surface at a position substantially directly above the at depth position of the device in the wellbore. Such checkshot surveys, as suggested above, may be performed with a source in the wellbore and the sensor at the surface, or may be performed using a seismic energy source at the surface and disposing a seismic sensor in the checkshot wellbore. In any of the foregoing cases, the seismic energy travels from source to receiver along a substantially vertical travel path. It will be appreciated by those skilled in the art that using a vertical wellbore may provide the advantage of being able to use the surface device without the need to move it for each "shot" to be directly above the device in the wellbore. Nonetheless, all the above configurations can provide useful data for performing the method of the invention.

When the checkshot survey is so conducted, the initial velocity model obtained using the checkshot survey represents the velocity of seismic waves traveling in the vertical direction. The initial velocity model is assumed to be isotropic, it therefore does not change seismic velocity in the lateral direction (vertical to transverse). The 1D isotropic velocity model and determined P-wave arrivals may then be used to estimate the horizontal position of the observed microseismic events. The depth of the microseismic events thus determined is initially fixed to the depth of fracturing or depth derived from a location in a scaled isotropic model. The positions of the determined events are then inverted to obtain the origin times of each event and the effective anisotropic parameters with vertical axis of symmetry (VTI). The inversion of VTI parameters of anisotropy is dependent on the origin times and depths and vice versa. Thus, in a method according to the invention, iteration is performed between inversion for anisotropic parameters and inversion for origin times and depths of microseismic events (or inversion for anisotropic parameters and inversion for origin times of string shots), while minimizing arrival time residuals.

In order to invert for the anisotropic parameters, it is necessary to pick arrival times of quasi compressional (qP) waves from good quality events recorded throughout the subsurface formation of interest. The compressional wave velocity along the direction of propagation from the origin to any particular seismic sensor can be calculated with $v_{P(\Theta=0)}$ in which Vp is the vertical velocity, and the dip angle between the vertical axis and the seismic energy ray direction is represented by $\Theta$. The weak ($\epsilon$, $\delta \ll 1$) elastic VTI anisotropic qP-wave velocity can be approximated by the expression:

$$v_P(\Theta) \approx v_{P(\Theta=0)}[1+\delta \sin^2\Theta+(\epsilon-\delta)\sin^4\Theta]$$

Where $\epsilon$, $\delta$ are Thomsen's parameters. In a homogeneous medium, the anisotropic travel time is computed with reciprocal (linearized for weak VTI) value from a simple relationship of distance x divided by dip-dependent velocity $v_P(\Theta)$ $$T_P^{propag}(\Theta) = \frac{x}{v_{P(\Theta)}}$$

$$= \frac{1}{v_{P(\Theta=0)}} \left[ \frac{1}{1 + \delta \sin^2\Theta + (\varepsilon - \delta)\sin^4\Theta} \right] \cdot x$$

$$\approx \Box \frac{1}{v_{P(\Theta=0)}} [1 - \delta \sin^2\Theta - (\varepsilon - \delta)\sin^4\Theta] \cdot x$$

For a homogeneous layer, i, in a multiple layer formation:

$$\frac{T_{Pi}(\Theta)}{x_i} - \left(\frac{1}{\alpha_i}\right) = \left(\frac{1}{\alpha_i}\delta\right)\sin^2\Theta_i + \frac{1}{\alpha_i}(\varepsilon - \delta)\sin^4\Theta_i$$

Where $\alpha_i = V_{P(\Theta=0)}$, $x_i$ is the distance traveled by P-waves in the i-th layer. Thus for the travel time in layered VTI media an expression can be derived as follows:

$$T_P^{Ani} = \sum_{i=1}^{n} T_{Pi}$$

$$= \sum_{i=1}^{n} \frac{x_i}{\alpha_i} + \delta \sum_{i=1}^{n} \frac{\sin^2\Theta_i}{\alpha_i} x_i + (\varepsilon - \delta) \sum_{i=1}^{n} \frac{\sin^4\Theta_i}{\alpha_i} x_i$$

$$= T_P^{Iso} + \delta A + (\varepsilon - \delta) B$$

wherein $$A = \sum_{i=1}^{n} \frac{\sin^2\Theta_i}{\alpha_i} x_i \qquad B = \sum_{i=1}^{n} \frac{\sin^4\Theta_i}{\alpha_i} x_i$$

Both A and B in the above expressions are a function of both the seismic event location as well as the seismic sensor position for each event.

The location of each microseismic event is then defined as the position in which the arrival times $T_P$ are those which best fit the origin time plus travel time for all the seismic sensors (12 in FIG. 1). If the travel time is set to be the time for the i-th receiver from the j-th event, it would be written as follows:

$$R_{ij} = T_{P_{ij}}^{Pick} - T_{P_{ij}}^{Ani} - T_{0_j} = T_{P_{ij}}^{Pick} - \delta A - (\epsilon - \delta) B - T_{0_j}$$

to minimize overall residuals $$\sum_{j=1}^{m} \sum_{i=1}^{n} R_{ij}$$

in a least square norm:

$$\sum_{j=1}^{m} \sum_{i=1}^{n} R_{ij} = -A\delta - B(\varepsilon - \delta) + C_{ij}$$

$C_{ij}$ does not depend on $\epsilon$ or $\delta$. Thus the above expression can be rewritten as:

$$d = G \cdot m$$

where $$m = [\delta; \varepsilon - \delta]$$

$$G = [-A, -B] \text{ and } d = \sum_{j=1}^{m} \sum_{i=1}^{n} R_{ij} - C_{ij}$$

which is a function of the event origin locations event and origin times. From the inversion it is possible to obtain the Thomsen parameters epsilon and delta.

To make the inversion possible, it is necessary to determine $C_{ij}$ which is a function of event locations, vertical velocity and origin times. As weak VTI does not alter the ray trajectory $x_i, \theta_i$ does not depend on the values of $\epsilon, \delta$ (to the first order) and can be computed using the 1D isotropic model.

For microseismic events, and often even for string shots (and/or check shots in the subsurface), the origin time is considered unknown. For a given velocity model and depth one can calculate seismic energy travel times $T_{P_{ij}}^{Ani}$ and compute event origin times as:

$$T_0 = \sum_{i=1}^{n} (T_{P_i}^{Pick} - T_{P_i}^{Ani})/Nrec$$

Figure 2:
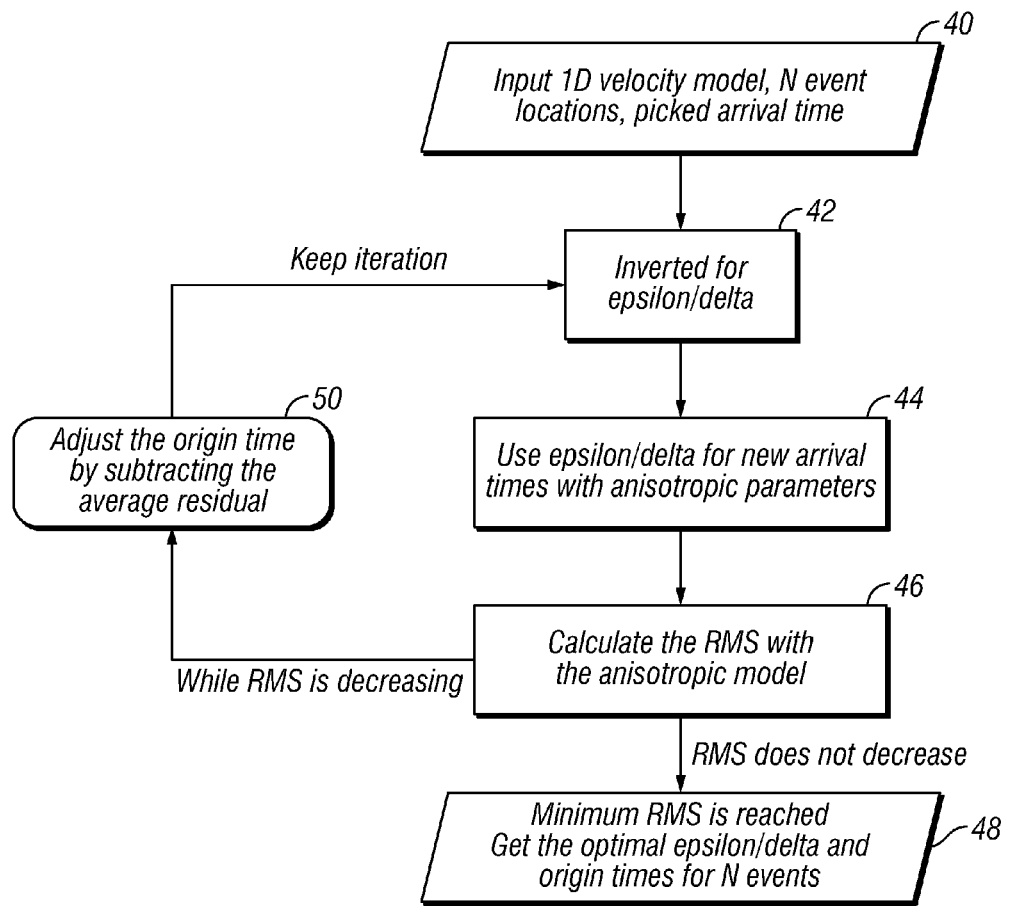
FIG. 2 shows a flow chart of one part of an inversion procedure according to the invention.

A flow chart of a procedure for determining event origin times without a depth search using the above described inversion is displayed in the flow chart in FIG. 2. At 40, a 1D velocity model of the subsurface formations may be used. The 1D velocity model may be obtained as explained above. Locations for a selected number N of microseismic events may be determined using the 1D (or 3D) velocity model and the selected event arrival times (selected as explained above). At 42, the event locations and arrival times are inverted to obtain initial estimates of the Thomsen parameters. Using the initial estimates of the Thomsen parameters, at 44 the arrival times of the events for the identified origin locations are adjusted. By using the Thomsen parameters, the 1D initial isotropic model then becomes a VTI model. At 46, RMS difference of arrival times and travel times (RMS misfit) are calculated using the VTI model. The process continues adjusting the origin time while inverting for new VTI parameters, at 50, until the overall RMS of arrival times does not decrease further. The minimum RMS misfit is then reached and it is then possible to obtain final estimates of the Thomsen parameters $\epsilon$, $\delta$ and the origin time for each of the N events as the results of the inversion.

As compared to the usually well known event depths when using perforation shots or string shots, uncertainties in the depths of actual microseismic events still exist. In order to provide accurate depth information concerning the location of the microseismic events and additionally to evaluate the effects of depth on the anisotropic parameters, the steps of grid searching for depths may be added to the inversion procedure. Such is illustrated in the flow chart shown in FIG. 3. The depth searching process is included within the iteration for origin times by the method of doing one event each time and using the updated depths as the inputs, and applying the stop condition as the minimized value of the overall sum of RMS misfit $R_{ij}^2$. At 60, initial depths are estimated for each of the plurality (N) of identified events.

Figure 3:
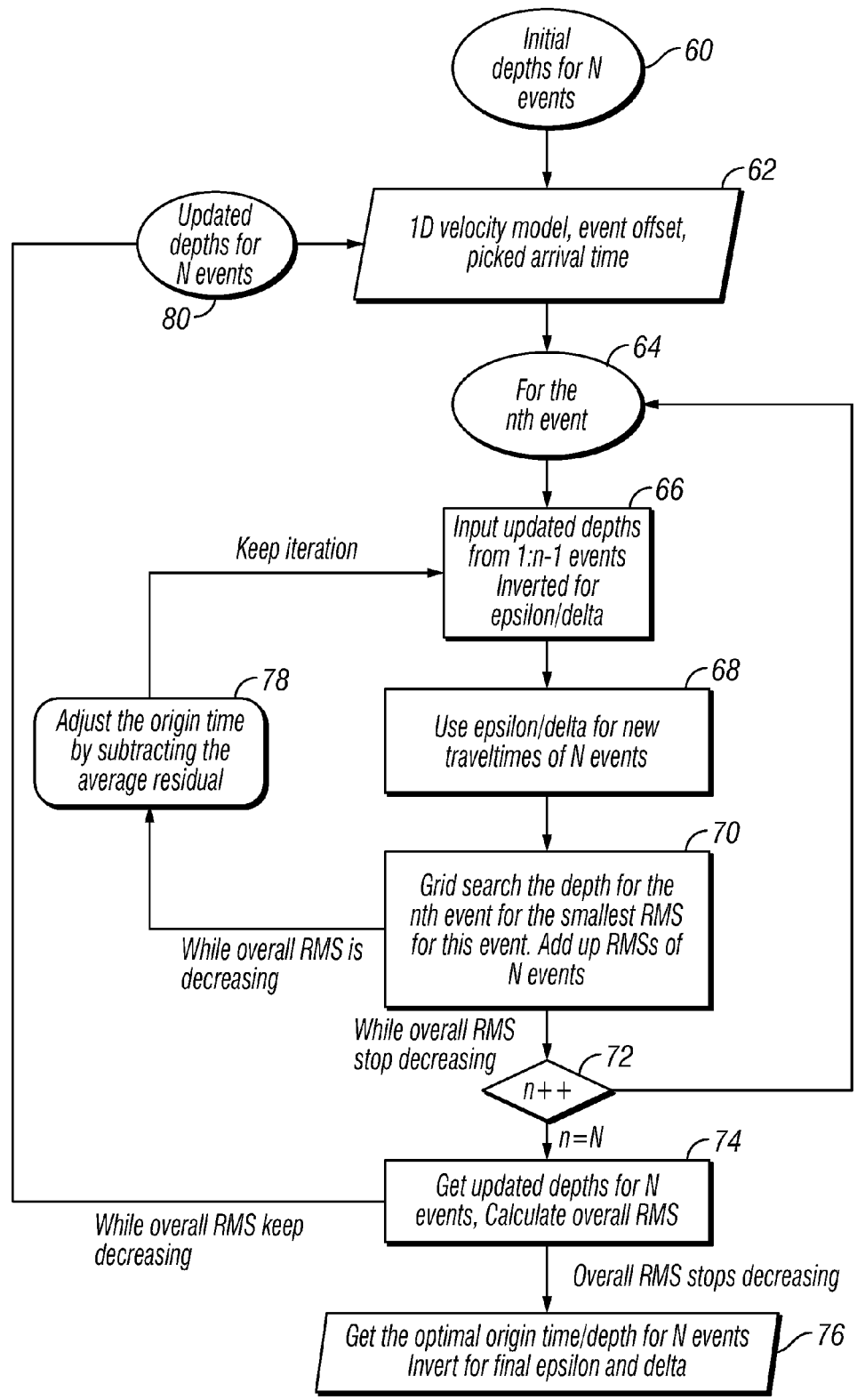
FIG. 3 shows a flow chart of another part of an inversion procedure according to the invention.

As in the example of FIG. 2, at 62 in FIG. 3, a 1D velocity model is created. For a first one of the N identified events, at 64, an inversion is performed for weak VTI Thomsen parameters, at 66. The inversion can be performed as explained with reference to FIG. 2. At 68, using the VTI velocity model, the travel times of each of the N events can be updated. At 70, the first event can be "grid searched" to determine the depth resulting in the smallest RMS misfit. At 78, if the RMS misfit has decreased, the origin time, at 78, may be adjusted and the inversion repeated. The foregoing procedure may be repeated until the RMS misfit no longer decreases. At 72, a next one of the events may be entered into the foregoing inversion procedure, starting at entry point 64. The process may be repeated for each of the remaining of the N events, at 80, until the RMS velocity stops decreasing. Then, at 76, the optimal origin time and positions thus determined may be used to invert for final values of the Thomsen parameters. Having final values of Thomsen parameters may then be used in the velocity model for identification of origin time and position of subsequent microseismic events.

The microseismic events so located may be further processed using the technique described in the Duncan et al. patent referred to above to obtain more precise event origin time and location with the final VTI model. The foregoing procedures may be used, as explained with reference to FIG. 1, for mapping the fracture fluid front with respect to time during a fracture treatment operation. One technique is to generate and/or display a map of the located seismic events determined to be caused by the hydraulic fracturing.

In certain instances it may be possible to reduce the inversion procedure if certain parameters are known. For example, if the origin time of the seismic events is known such as a from "string shot" checks, it may be possible to perform the inversion without the need to determine origin time of the seismic events. Still further, if the depth and/or horizontal (coordinate) position of the events is known, the inversion may be performed without the need to locate depth and/or horizontal position as these parameters are already known.

Figure 4:
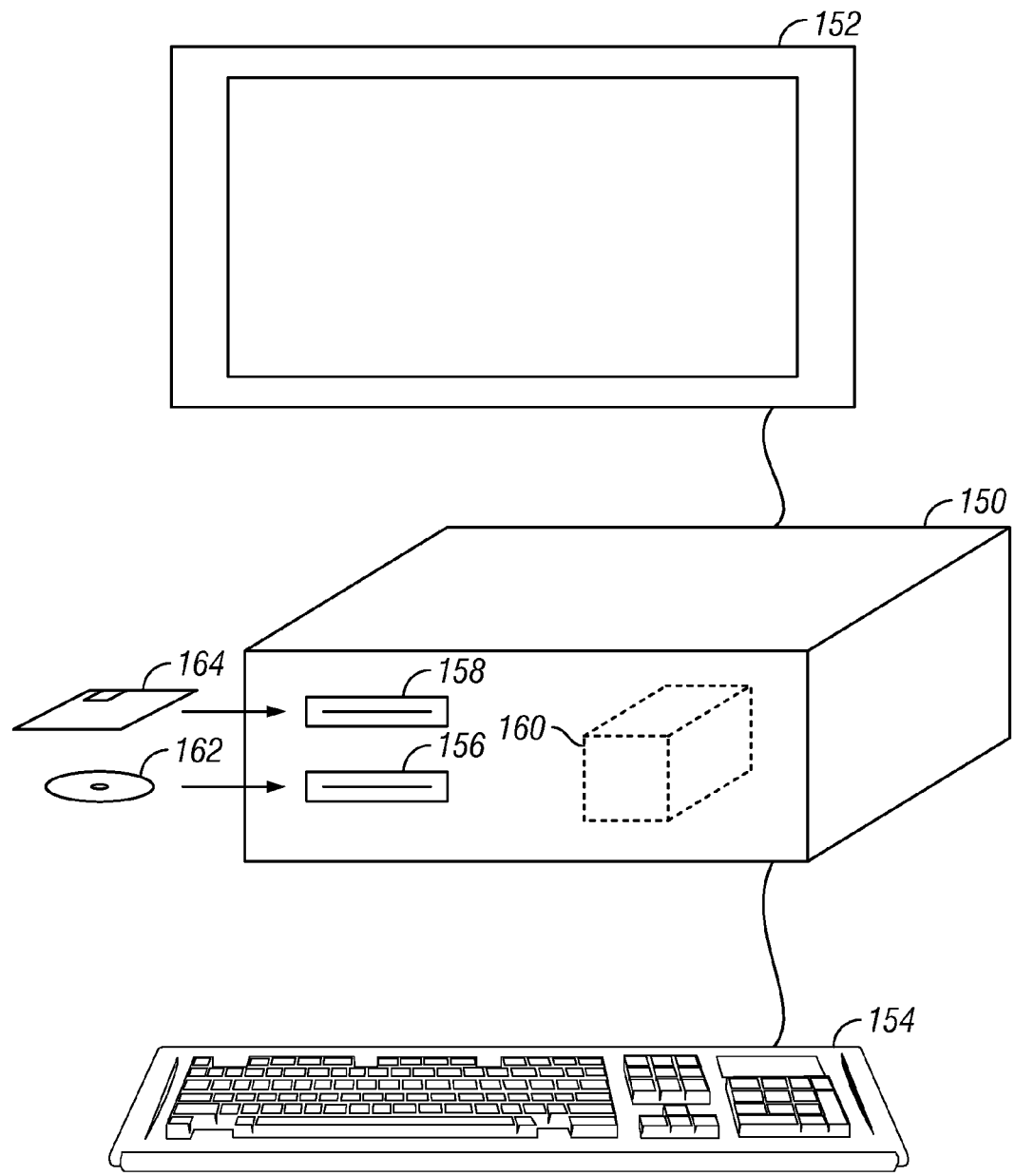
FIG. 4 shows a general purpose programmable computer with various computer readable media that may store a computer program capable of causing the computer to perform the method of the invention.

In another aspect, the invention relates to computer programs stored in computer readable media. Referring to FIG. 4, the foregoing process as explained with reference to FIGS. 2-4, can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. The computer may form part of the recording unit (10 in FIG. 1) or may be another computer. According to this aspect of the invention, the computer readable medium includes logic operable to cause the computer to execute acts as set forth above and explained with respect to the previous figures. The user display 152 may also be configured to show hypocenter locations and fracture networks determined as explained above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining positions and origin times of seismic events occurring in the Earth's subsurface, comprising:
generating a one dimensional velocity model of the subsurface by recording travel time of seismic energy between the surface and selected depths in a substantially vertical wellbore;
accepting as input to the method signals recorded from a plurality of seismic sensors deployed at or above a subsurface volume of interest, the recorded signals being a physical representation of seismic amplitude with respect to time;
inverting the signals using non-linear inversion to obtain an origin time of seismic events in the subsurface and to obtain Thomsen's parameters in formations in the volume of interest; and
searching for depths of each of the seismic events by individually searching the depth of each seismic event, the inversion with each incorporated new depth including updating the Thomsen parameters and setting as a limit a minimum value of RMS error.

2. The method of claim 1 wherein the seismic events have known depth and horizontal position and no search for depth is performed.

3. The method of claim 1 wherein the seismic events have known depth and horizontal position and origin time and no search for depth or determination of origin time is performed.

4. The method of claim 3 wherein the origin times and locations determined from the arrival times by initially assuming the rock formations have isotropic velocity.

5. The method of claim 3 wherein the origin time are selected by identifying events in stacked signals exceeding a selected amplitude threshold.

6. The method of claim 1 wherein the seismic events are induced by hydraulic fracturing of a rock formation in the subsurface volume.

7. The method of claim 1 wherein the origin times and locations are determined from arrival times of selected amplitude events detected in the recorded signals.

8. The method of claim 1 wherein the subsurface seismic events are caused by hydraulic fracturing of at least one subsurface formation.

9. The method of claim 8 further comprising generating a map of the origin positions of the events caused by the fracturing.

10. A non-transitory computer readable medium having stored thereon a program, the program having logic operable to cause a programmable computer to perform a method for determining positions and origin times of seismic events occurring in the Earth's subsurface, comprising:
generating a one dimensional velocity model of the subsurface by recording travel time of seismic energy between the surface and selected depths in a substantially vertical wellbore;
accepting as input to the method signals recorded from a plurality of seismic sensors deployed at or above a subsurface volume of interest, the recorded signals being a physical representation of seismic amplitude with respect to time;
inverting the signals using non-linear inversion to obtain an origin time of seismic events in the subsurface and to obtain Thomsen's parameters in formations in the volume of interest; and
searching for depths of each of the seismic events by individually searching the depth of each seismic event, the inversion with each incorporated new depth including updating the Thomsen parameters and setting as a limit a minimum value of RMS error.

11. The computer readable medium of claim 10 wherein the seismic events are induced by hydraulic fracturing of a rock formation in the subsurface volume.

12. The computer readable medium of claim 10 wherein the origin times and locations are determined from arrival times of selected amplitude events detected in the recorded signals.

13. The computer readable medium of claim 12 wherein the arrival times are selected by identifying events in stacked signals exceeding a selected amplitude threshold.

14. The computer readable medium of claim 12 wherein the origin times and locations determined from the arrival times by initially assuming the rock formations have isotropic velocity.

15. The computer readable medium of claim 10 wherein the subsurface seismic events are caused by hydraulic fracturing of at least one subsurface formation.

16. The computer readable medium of claim 15 further comprising instructions for causing the computer to perform generating a map of the origin positions of the events caused by the fracturing.

* * * * *